(12) United States Patent
Ozaki (10) Patent No.: US 10,789,028 B2
(45) Date of Patent: Sep. 29, 2020

(54) INFORMATION PROCESSING APPARATUS, IMAGE FORMING APPARATUS, DISPLAY CONTROL METHOD, AND DISPLAY CONTROL PROGRAM

(71) Applicant: FUJIFILM Corporation, Tokyo (JP)

(72) Inventor: Yukihisa Ozaki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/561,048

(22) Filed: Sep. 5, 2019

(65) Prior Publication Data

US 2019/0391773 A1 Dec. 26, 2019

Related U.S. Application Data

(63) Continuation of application No. PCT/JP2018/002177, filed on Jan. 25, 2018.

(30) Foreign Application Priority Data

Mar. 30, 2017 (JP) ................................. 2017-067865

(51) Int. Cl.
*G06F 3/12* (2006.01)
*H04N 1/00* (2006.01)

(52) U.S. Cl.
CPC ............ *G06F 3/1243* (2013.01); *G06F 3/121* (2013.01); *G06F 3/1208* (2013.01); *H04N 1/00029* (2013.01); *H04N 1/00037* (2013.01)

(58) Field of Classification Search
CPC ...... G06F 3/1243; G06F 3/1208; G06F 3/121; G06F 3/1234; G06F 3/1259;
(Continued)

(56) References Cited

U.S. PATENT DOCUMENTS 8,760,716 B2 * 6/2014 Yamada ............... G03G 15/556
358/1.13
9,313,341 B2 4/2016 Miyagawa et al.
(Continued)

FOREIGN PATENT DOCUMENTS

JP 2014198465 10/2014
JP 2014199244 10/2014
(Continued)

OTHER PUBLICATIONS

"International Search Report (Form PCT/ISA/210) of PCT/JP2018/002177," dated Apr. 10, 2018, with English translation thereof, pp. 1-5.
(Continued)

*Primary Examiner* — Neil R McLean
(74) *Attorney, Agent, or Firm* — JCIPRNET (57) ABSTRACT

An image forming apparatus 10 includes a control unit 20 that, when images are successively formed on a plurality of recording media by an image forming unit 22, obtains waste-sheet information indicating whether each of the plurality of recording media is a waste sheet and, for a waste sheet, indicating a cause of the waste sheet; identifies whether each of the recording media is a waste sheet in accordance with the obtained waste-sheet information; and, in a case of a waste sheet, performs control to arrange and display, on a touch panel display 35, a waste-sheet state display image 54 that makes a cause of the waste sheet distinguishable in chronological order of formation of the images.

15 Claims, 9 Drawing Sheets

(58) Field of Classification Search
CPC .............. G06F 3/1285; H04N 1/00029; H04N 1/00037; B41J 29/38; B41J 29/393; B41J 29/42; G03G 21/00
See application file for complete search history.

(56) References Cited

U.S. PATENT DOCUMENTS

| | | | |
|---|---|---|---|
| 10,250,764 B2 * | 4/2019 | Noguchi | ............ H04N 1/00506 |
| 2003/0234960 A1 | 12/2003 | Kaltenbach et al. | |
| 2014/0270397 A1 | 9/2014 | Sochi | |
| 2014/0341437 A1 | 11/2014 | Araki et al. | |

FOREIGN PATENT DOCUMENTS

| | | |
|---|---|---|
| JP | 2014199246 | 10/2014 |
| JP | 2015117957 | 6/2015 |
| JP | 2016182758 | 10/2016 |

OTHER PUBLICATIONS

"Written Opinion of the International Searching Authority (Form PCT/ISA/237) of PCT/ JP2018/002177," dated Apr. 10, 2018, with English translation thereof, pp. 1-7.

* cited by examiner

| | | | |
|---|---|---|---|
| ◯ | | Lead Misregistration | 4/4 |
| ◯ | | Side Misregistration | 2/2 |
| ◯ | | Misfiring Nozzle | 5/5 |
| ◯ | | Video Transfer Fail | 5/5 |
| ◯ | | Eject Jammed Paper | 0 |
| ◯ | | Paper Missing | 0 |
| ◯ | | Other problems | 0 |
| | | User Selected | 0 |

INFORMATION PROCESSING APPARATUS, IMAGE FORMING APPARATUS, DISPLAY CONTROL METHOD, AND DISPLAY CONTROL PROGRAM

CROSS-REFERENCE TO RELATED APPLICATIONS

This application is a Continuation of PCT International Application No. PCT/JP2018/002177 filed on Jan. 25, 2018, which claims priority under 35 U.S.C. § 119(a) to Japanese Patent Application No. 2017-067865 filed on Mar. 30, 2017. Each of the above application(s) is hereby expressly incorporated by reference, in its entirety, into the present application.

BACKGROUND OF THE INVENTION

1. Field of the Invention

The present disclosure relates to an information processing apparatus, an image forming apparatus, a display control method, and a non-transitory computer readable recording medium storing a display control program.

2. Description of the Related Art

In the related art, when an image forming apparatus forms (i.e., prints) images on recording media, due to defects or the like in the formed images, a waste of sheets may be generated. A technique is known for presenting generation of a waste sheet to a user or the like when the waste sheet is generated.

For example, JP2014-198465A describes a technique for presenting, when images are successively formed on a plurality of recording media, a stacked position of a waste sheet among a plurality of recording media after images are formed, which are stacked in a sheet discharge tray.

The presentation of generation of a waste sheet allows the user to, for example, check the waste sheet and to perform reprinting by using the image forming apparatus, as needed.

SUMMARY OF THE INVENTION

In some cases, however, different countermeasures may be taken according to the cause of waste sheets. In addition, reprinting may be performed in different ways according to the cause of waste sheets, the state of the waste sheet, the position of the waste sheet (which of the recording media is a waste sheet), and so on. This sometimes makes it difficult for the user to perform reprinting. For example, the technique described in JP2014-198465A allows the user to determine the position of a waste sheet, but makes it difficult to identify a cause of the waste sheet. Thus, in some cases, it is not easy for the user to make an instruction to execute reprinting.

The present disclosure has been made in view of the foregoing situation, and it is an object of the present disclosure to provide an information processing apparatus, an image forming apparatus, a display control method, and a non-transitory computer readable recording medium storing a display control program that facilitate reprinting when a waste sheet is generated.

To achieve the object described above, an information processing apparatus according to an aspect of the present disclosure includes an obtaining unit that, when images are successively formed on a plurality of recording media by an image forming unit, obtains waste-sheet information indicating whether each of the plurality of recording media is a waste sheet and, for a waste sheet, indicating a cause of the waste sheet, and a control unit that identifies whether each of the recording media is a waste sheet in accordance with the waste-sheet information obtained by the obtaining unit, and, in a case of a waste sheet, performs control to arrange and display, on a display unit, a waste-sheet state display image that makes a cause of the waste sheet distinguishable in chronological order of formation of the images.

Further, the control unit of the information processing apparatus according to an aspect of the present disclosure may perform control to change a color of the waste-sheet state display image in accordance with the cause of the waste sheet, thereby making the cause of the waste sheet distinguishable.

Further, the control unit of the information processing apparatus according to an aspect of the present disclosure may perform control to further display, on the display unit, a correspondence relationship image indicating a correspondence relationship between the color and the cause of the waste sheet.

Further, in the information processing apparatus according to an aspect of the present disclosure, a priority may be determined in advance for each of causes of waste sheets, and the correspondence relationship image may be an image indicating correspondence relationships between a plurality of the colors and the causes of waste sheets in order in which the correspondence relationships are arranged according to the priorities.

Further, the control unit of the information processing apparatus according to an aspect of the present disclosure may cause a mark corresponding to the cause of the waste sheet to be superimposed and displayed on the waste-sheet state display image, thereby making the cause of the waste sheet distinguishable.

Further, in the information processing apparatus according to an aspect of the present disclosure, a priority may be determined in advance for each of causes of waste sheets, and when one waste sheet has a plurality of causes, the waste-sheet state display image may be an image that makes a highest-priority cause among the causes distinguishable.

Further, the control unit of the information processing apparatus according to an aspect of the present disclosure may perform control to further display, on the display unit, a waste-sheet position image indicating a position of the waste sheet in chronological order of formation of the images on the plurality of recording media.

Further, the control unit of the information processing apparatus according to an aspect of the present disclosure may cause the waste-sheet state display images for a predetermined number of recording media to be arranged and displayed in chronological order, starting from a recording medium designated by a user.

Further, the information processing apparatus according to an aspect of the present disclosure may further include a first acceptance unit that accepts designation of a waste sheet to be reprinted, a second acceptance unit that accepts an instruction to execute reprinting, and an output unit that outputs, when the second acceptance unit accepts an instruction to execute reprinting, a reprinting instruction to the image forming unit to reprint an image corresponding to the waste sheet for which designation has been accepted by the first acceptance unit.

Further, the information processing apparatus according to an aspect of the present disclosure may further include a notification unit that notifies a predetermined device of at least one of information concerning the waste sheet or information concerning the reprinting.

Further, the image forming unit of the information processing apparatus according to an aspect of the present disclosure may be configured to successively form images on both sides of the plurality of recording media, and the waste-sheet state display image may be an image that identifies whether each of a front side and a rear side of one of the recording media is a waste sheet and that, in a case of a waste sheet, makes a cause of the waste sheet distinguishable.

Further, the image forming unit of the information processing apparatus according to an aspect of the present disclosure may be configured to successively form images on the plurality of recording media by using variable printing.

An image forming apparatus according to an aspect of the present disclosure includes an image forming unit that successively form images on a plurality of recording media, an obtaining unit that, when the images are successively formed on the plurality of recording media by the image forming unit, obtains waste-sheet information indicating whether each of the plurality of recording media is a waste sheet and, for a waste sheet, indicating a cause of the waste sheet, and a control unit that identifies whether each of the recording media is a waste sheet in accordance with the waste-sheet information obtained by the obtaining unit, and, in a case of a waste sheet, performs control to arrange and display, on a display unit, a waste-sheet state display image that makes a cause of the waste sheet distinguishable in chronological order of formation of the images.

A display control method according to an aspect of the present disclosure includes processes of, when images are successively formed on a plurality of recording media by an image forming unit, obtaining waste-sheet information indicating whether each of the plurality of recording media is a waste sheet and, for a waste sheet, indicating a cause of the waste sheet; and identifying whether each of the recording media is a waste sheet in accordance with the obtained waste-sheet information, and, in a case of a waste sheet, performing control to arrange and display, on a display unit, a waste-sheet state display image that makes a cause of the waste sheet distinguishable in chronological order of formation of the images.

A non-transitory computer readable recording medium storing a display control program of the present disclosure includes processes of, when images are successively formed on a plurality of recording media by an image forming unit, obtaining waste-sheet information indicating whether each of the plurality of recording media is a waste sheet and, for a waste sheet, indicating a cause of the waste sheet; and identifying whether each of the recording media is a waste sheet in accordance with the obtained waste-sheet information, and, in a case of a waste sheet, performing control to arrange and display, on a display unit, a waste-sheet state display image that makes a cause of the waste sheet distinguishable in chronological order of formation of the images.

As used herein, a "waste-sheet state display image that makes a cause of waste sheets distinguishable" is synonymous with a "waste-sheet state display image that presents a cause of generation of waste sheets", and an "image that makes a cause of waste sheets distinguishable" is synonymous with an "image that presents a cause of generation of waste sheets".

According to the present disclosure, it is possible to facilitate reprinting when a waste sheet is generated.

DESCRIPTION OF THE PREFERRED EMBODIMENTS

The following describes an embodiment of the present disclosure in detail with reference to the drawings. It should be noted that this embodiment is not intended to limit the present disclosure.

Figure 1:
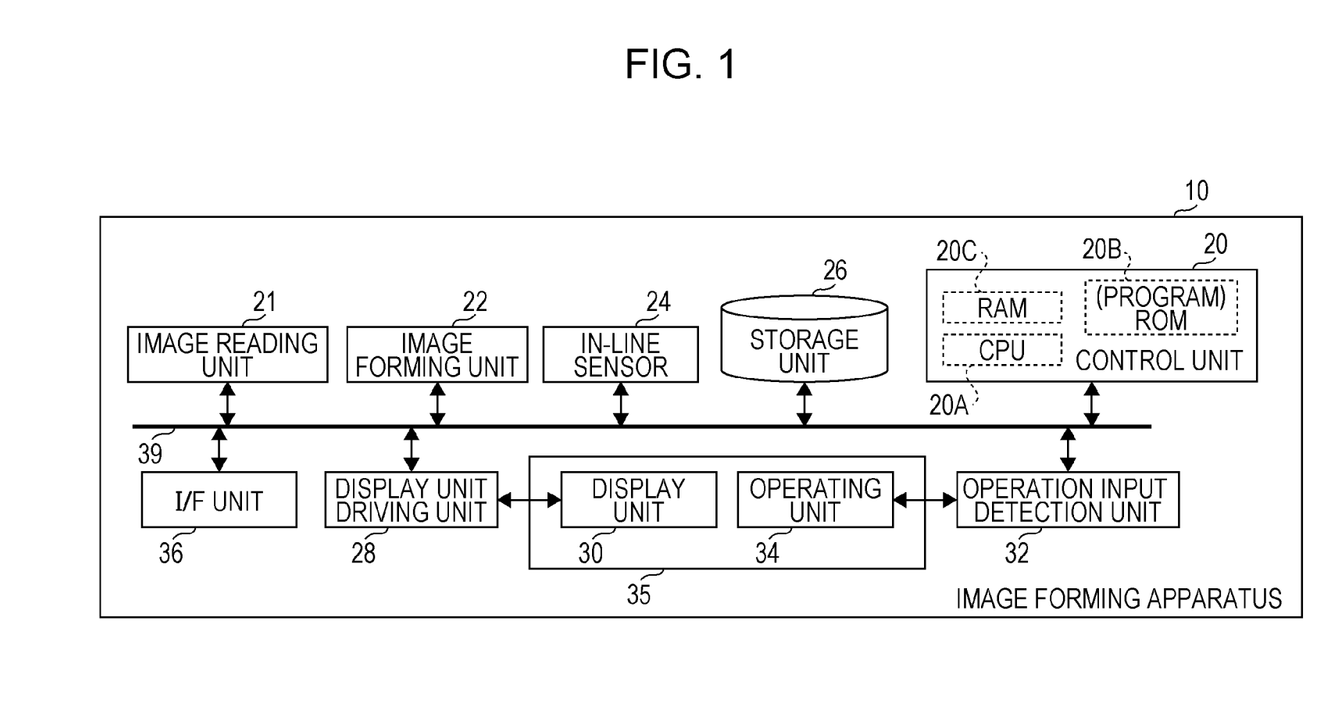
FIG. 1 is a block diagram illustrating an example configuration of an image forming apparatus of an embodiment.

First, a configuration of an image forming apparatus 10 of this embodiment will be described with reference to FIG. 1. FIG. 1 is a block diagram illustrating an example configuration of the image forming apparatus 10 of this embodiment. The image forming apparatus 10 of this embodiment is a so-called digital printer that forms an image on a recording medium. The medium used as a recording medium is not particularly limited, examples of which include paper containing cellulose as a main component, such as high-quality paper, coated paper, and art paper.

As illustrated in FIG. 1, the image forming apparatus 10 of this embodiment includes a control unit 20, an image reading unit 21, an image forming unit 22, an in-line sensor 24, a storage unit 26, a display unit driving unit 28, a display unit 30, an operation input detection unit 32, an operating unit 34, and an I/F (Interface) unit 36.

The control unit 20, the image reading unit 21, the image forming unit 22, the in-line sensor 24, the storage unit 26, the display unit driving unit 28, the operation input detection unit 32, and the I/F unit 36 are connected via a bus 39, such as a system bus or a control bus, so as to be capable of sending and receiving various information to and from each other.

The control unit 20 of this embodiment controls the overall operation of the image forming apparatus 10. The control unit 20 of this embodiment includes a CPU (Central Processing Unit) 20A, a ROM (Read Only Memory) 20B, and a RAM (Random Access Memory) 20C. The ROM 20B stores in advance various programs that are executed by the CPU 20A, and so on. The RAM 20C temporarily stores various data. The control unit 20 of this embodiment corresponds to an example of an obtaining unit, a control unit, a first acceptance unit, a second acceptance unit, an output unit, and a notification unit of the present disclosure.

The image reading unit 21 has a so-called scanner function of reading an image formed on a recording medium and generating image data indicating the read image. The image forming unit 22 has a function of forming an image on a recording medium on the basis of the image data generated by the image reading unit 21, image data accepted through the I/F unit 36, or the like. The image forming unit 22 of this embodiment is configured to form an image by using so-called variable printing. The image forming unit 22 of this embodiment is also configured to form images on both sides (front side and rear side) of a recording medium.

The in-line sensor 24 has a function of reading an image formed on a recording medium by the image forming unit 22 and generating image data indicating the read image.

The storage unit 26 stores the image data generated by the image reading unit 21, image data accepted through the I/F unit 36, other various information, and so on. Specific examples of the storage unit 26 include an HDD (Hard Disk Drive) and an SSD (Solid State Drive).

The display unit 30 displays various information such as information indicating a waste-sheet state described in detail below. The display unit driving unit 28 controls display of various information on the display unit 30 in accordance with the control of the control unit 20.

The operating unit 34 is used by a user to input an instruction related to image formation or the like including an instruction related to reprinting. The operating unit 34 is not particularly limited, examples of which include a touch panel, a touch pen, a keyboard, and a mouse. In this embodiment, the operating unit 34 and the display unit 30 are integrated into a single unit called a touch panel display 35. The operation input detection unit 32 detects an operating state of the operating unit 34. The operation input detection unit 32 of this embodiment corresponds to an example of a first acceptance unit and a second acceptance unit of the present disclosure.

The I/F unit 36 performs communication of various information with an external device via wireless communication or wired communication. The I/F unit 36 of this embodiment corresponds to an example of a notification unit of the present disclosure.

When images are successively formed on a plurality of recording media by the image forming unit 22, the control unit 20 of the image forming apparatus 10 of this embodiment performs control to display, on the touch panel display 35, a display image indicating a situation related to generation of waste sheets.

Figure 2:
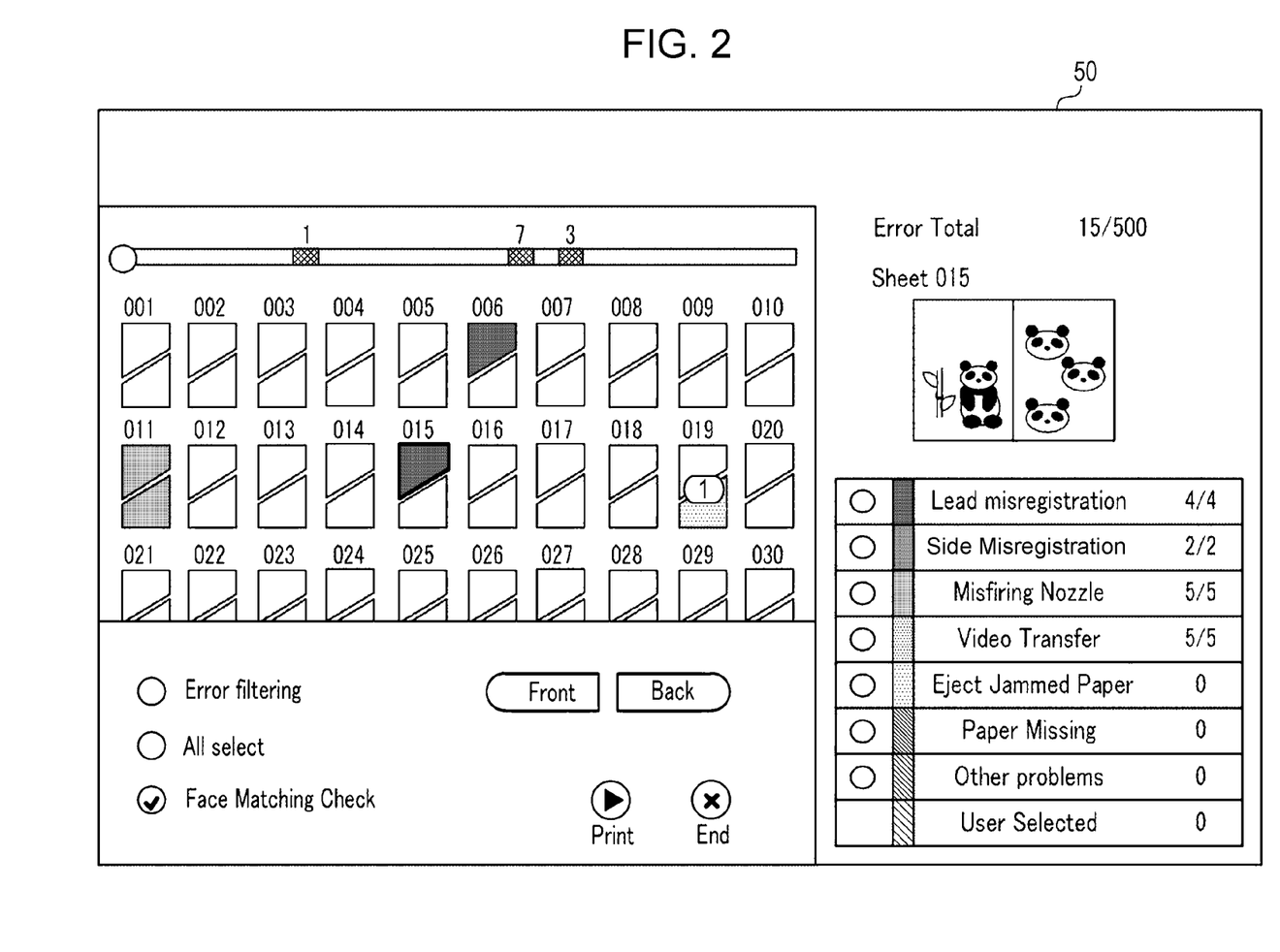
FIG. 2 is a diagram illustrating an example of a display image displayed on a touch panel display of the image forming apparatus of the embodiment.
Figure 3:
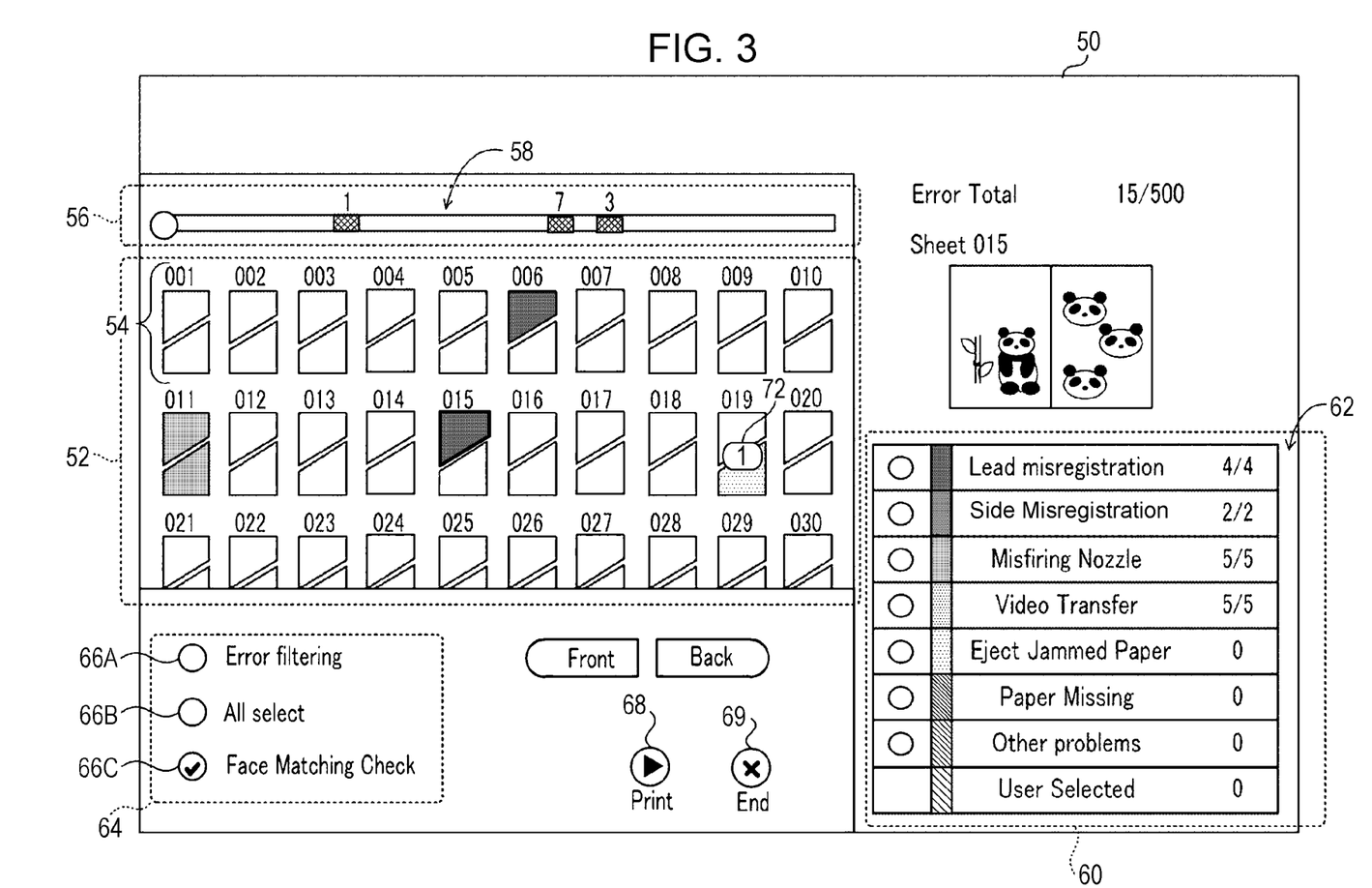
FIG. 3 is a diagram illustrating an example of a display image displayed on the touch panel display of the image forming apparatus of the embodiment.

First, a display image indicating a situation related to generation of waste sheets according to this embodiment will be described. FIG. 2 and FIG. 3 illustrate diagrams depicting an example of a display image 50. As illustrated in FIG. 2 and FIG. 3, the display image 50 includes a plurality of images. In FIG. 2, numerals given to the images included in the display image 50 are omitted for ease of viewing. In the following, the details of the images will be described with reference to FIG. 3.

In a first display region 52 of the display image 50, waste-sheet state display images 54, each indicating information concerning a waste-sheet state for one of recording media, are arranged and displayed in chronological order of formation of the images. In the image forming apparatus 10 of this embodiment, sheet numbers are assigned to the recording media in chronological order of formation of the images, such as first, second, and so on.

Figure 4:
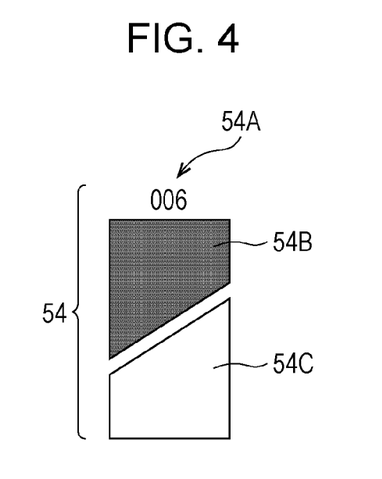
FIG. 4 is a diagram illustrating a waste-sheet state display image of the embodiment.

As an example, as illustrated in FIG. 4, each of the waste-sheet state display images 54 of this embodiment includes a sheet number 54A indicating which of the recording media on which the images are successively formed the corresponding recording medium is, an image 54B indicating a result of printing on the front side, and an image 54C indicating a result of printing on the rear side. The sheet number 54A illustrated in FIG. 4 indicates that the recording medium is the sixth. The image 54B indicates that the front side is a waste sheet as a result of printing and also indicates the cause of the waste sheet. The image 54C indicates that the rear side is not a waste sheet as a result of printing.

In the image forming apparatus 10 of this embodiment, whether a waste sheet is generated is represented by changing the colors of the image 54B and the image 54C. In FIG. 2 to FIG. 4, for convenience of illustration, a different color of an image is represented by using a difference in hatch pattern. As depicted in the image 54C, the application of no hatch pattern indicates that no waste sheet is generated. In the image forming apparatus 10 of this embodiment, furthermore, the colors of the image 54B and the image 54C differ depending on the cause of the waste sheet. If a surface, which is a waste sheet, has a plurality of causes, the colors of the image 54B and the image 54C are colors corresponding to a cause having the highest priority among the causes (the details will be described below). The relationship between causes of waste sheets and colors will be described in detail below. For causes of waste sheets, what state is referred to as a "waste sheet" may be determined in advance and are not particularly limited. The causes of waste sheets in this embodiment will be described in detail below.

As illustrated in FIG. 3, in the first display region 52, due to the limited number of waste-sheet state display images 54 that can be displayed, waste-sheet state display images 54 for only some recording media out of the recording media on which images are formed may be displayed in some cases. In the display image 50 in the initial state where the display image 50 is displayed on the touch panel display 35 for the first time after images are successively formed on a plurality of recording media, as an example, as illustrated in FIG. 3, the waste-sheet state display images 54 are arranged and displayed in sequence from the first recording medium in the first display region 52.

In a second display region 56 of the display image 50, a waste-sheet position image 58 is displayed indicating the position of a waste sheet in chronological order of formation of the images on the recording media, that is, which recording medium is a waste sheet.

Figure 5:
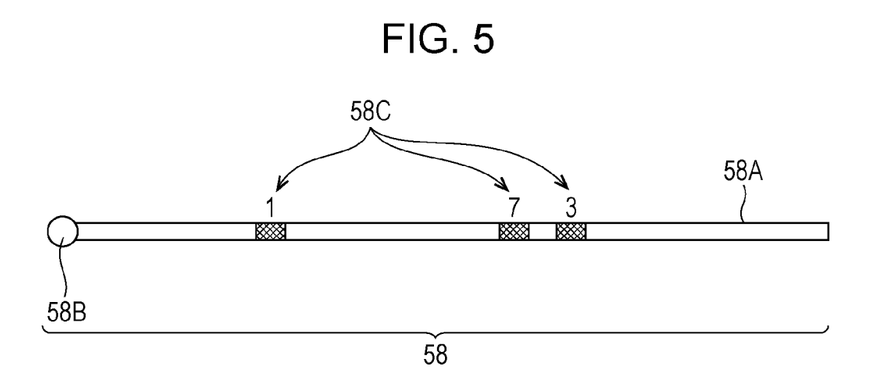
FIG. 5 is a diagram illustrating a waste-sheet position image of the embodiment.

For example, as an example, as illustrated in FIG. 5, the waste-sheet position image 58 of this embodiment includes a bar image 58A indicating the total quantity of the recording media, a slider image 58B, and numbers 58C, each indicating the number of waste sheets. The end of the bar image 58A illustrated in FIG. 5 on the left side in FIG. 5 indicates the position of the first recording medium, and the end thereof on the right side indicates the position of the last recording medium. The waste-sheet position image 58 illustrated in FIG. 5 indicates that one waste sheet is generated at about 30 percent of all the sheets on which images are formed, counted from the initial (first) sheet, seven waste sheets are generated at about 60 percent, and three waste sheets are generated at about 70 percent. In the image forming apparatus 10 of this embodiment, "one" waste sheet is counted when only the front side is waste, when only the rear side is waste, and when both sides are waste.

The slider image 58B is movable along the bar image 58A by the user's operation. By sliding the slider image 58B through the touch panel display 35, the waste-sheet state display images 54 are arranged and displayed in the first display region 52 in sequence from the recording medium corresponding to the position of the slider image 58B. This embodiment is not meant to be limiting. For example, in an embodiment, the user may scroll the first region 52 of the display image 50 or perform other operation through the touch panel display 35 for designation, thereby arranging and displaying the waste-sheet state display images 54 in the first region 52 in sequence from the recording medium designated by the user in the first region 52.

In a third display region 60 of the display image 50, a correspondence relationship image 62 is displayed indicating a correspondence relationship between a color for making a cause of waste sheets distinguishable and the cause of waste sheets.

Figure 6:
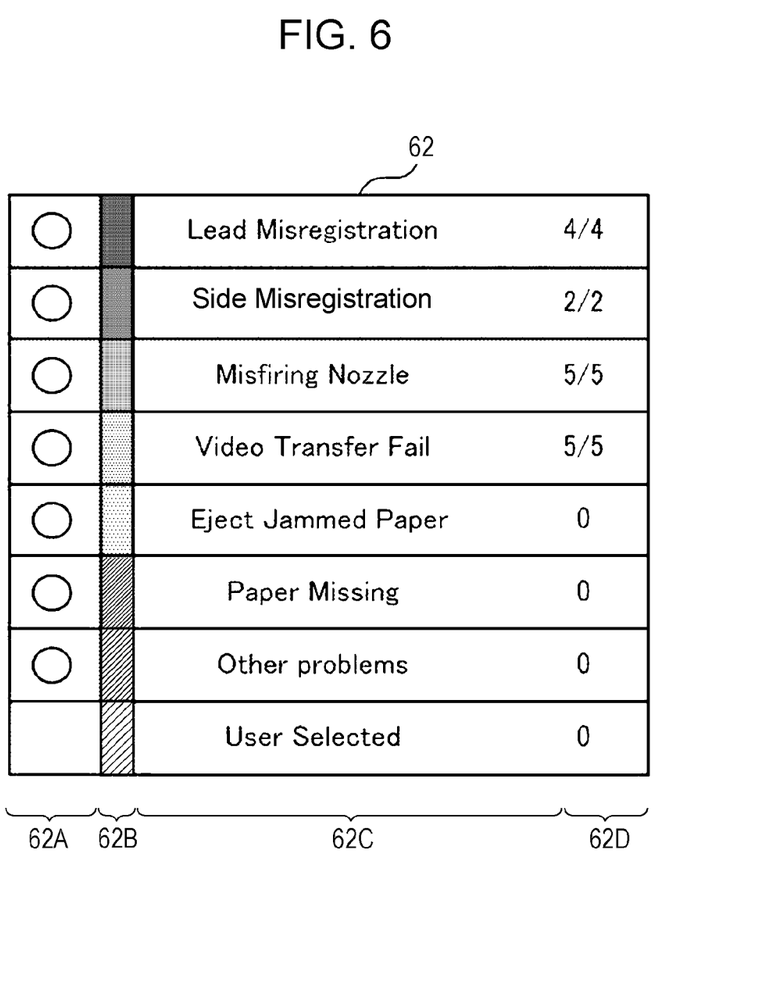
FIG. 6 is a diagram illustrating a correspondence relationship image of the embodiment.

For example, in the correspondence relationship image 62 illustrated in FIG. 6, for each cause of waste sheets, a selection button 62A for selecting the cause of waste sheets, a color image 62B, text 62C indicating the cause of waste sheets, and a number 62D indicating the number of waste sheets are arranged as the correspondence relationship described above in order of priority of causes of waste sheets. For example, in the example illustrated in FIG. 6, causes of waste sheets are arranged from top to bottom in descending order of priority. The priorities of the causes of waste sheets may be determined in advance in accordance with the application of the image forming apparatus 10 or may be set, as desired, by the user using the touch panel display 35 or the like. Alternatively, the control unit 20 may record the frequency of generation of waste sheets according to causes of waste sheets and set a higher priority for a higher-frequency cause.

In the image forming apparatus 10 of this embodiment, descriptions represented by the text 62C may be employed as causes of waste sheets. For example, "Lead Misregistration" is so-called front-to-back misregistration, which corresponds to a state where misregistration occurs in a recording medium in the transport direction of the recording medium during image formation by the image forming unit 22, that is, a state where an image is printed with a shift in the transport direction of the recording medium. "Side Misregistration" is so-called side-to-side misregistration, which corresponds to a state where misregistration occurs in a recording medium toward the left edge, as seen in the transport direction of the recording medium, during image formation by the image forming unit 22, that is, a state where an image is printed with a shift in a direction perpendicular to the transport direction of the recording medium. "Misfiring Nozzle" is a state where, due to failure such as clogging of a nozzle through which ink is ejected to form an image during image formation by the image forming unit 22, a white streak is generated in the formed image. "Video Transfer Fail" is a state where an image data failure occurs due to a system error, malfunction, or the like during image formation by the image forming unit 22 and an image defect occurs. "Eject Jammed Paper" is a state where wrinkling and the like occur in a recording medium. "Paper Missing" is a state where when the image forming unit 22 forms an image on the front side, a mark such as a bar code is formed on the front side, the bar code formed on the front side is read when an image is formed on the rear side, and as a result of determination of whether a combination of the image on the front side and the image on the rear side is appropriate, the combination is determined not to be appropriate. It goes without saying that causes of waste sheets are not limited to these.

By referring to the color images 62B and the text 62C in the correspondence relationship image 62, it is found that in the first display region 52 illustrated in FIG. 3, a waste sheet caused by "Lead Misregistration" is generated on the front side of the sixth recording medium and waste sheets caused by "Misfiring Nozzle" are generated on the front side and rear side of the eleventh recording medium. It is also found that a waste sheet caused by "Lead Misregistration" is generated on the front side of the fifteenth recording medium and that a waste sheet caused by "Eject Jammed Paper" is generated on the rear side of the nineteenth recording medium.

The selection buttons 62A of the correspondence relationship image 62 are buttons designated by the user to make a reprinting instruction. In the image forming apparatus 10 of this embodiment, the user designates one of the selection buttons 62A corresponding to a cause of waste sheets for which reprinting is to be performed, thereby reprinting all the waste sheets corresponding to the designated cause of waste sheets.

Each of the numbers 62D indicates the designated number of copies to be reprinted and the number of waste sheets due to the corresponding cause of waste sheets. In FIG. 6, a value on the left side of "/" indicates the designated number of copies to be reprinted, and a value on the right side indicates the number of waste sheets generated due to the corresponding cause of waste sheets.

On the other hand, as illustrated in FIG. 3, in a fourth display region 64 of the display image 50, a selection button 66A, a selection button 66B, and a selection button 66C are displayed. The selection button 66A is a button designated by the user to reprint all waste sheets. The selection button 66B is a button designated by the user to reprint all the recording media, or all the images. The selection button 66C is a button designated by the user to individually designate a recording medium to be reprinted. In FIG. 3, a state is illustrated where the selection button 66C has been designated by the user. When the selection button 66C is designated, the user designates one of the waste-sheet state display images 54 corresponding to the waste sheet (recording medium) designated to be reprinted. The waste-sheet state display image 54 designated by the user as the target to be reprinted is displayed with a number of copies to be reprinted 72. In the display image 50 illustrated in FIG. 3, a state is illustrated where the nineteenth waste-sheet state display image 54 is designated as the target to be reprinted and the waste-sheet state display image 54 is displayed with the number of copies to be reprinted 72. In the image forming apparatus 10 of this embodiment, a recording medium that is not a waste sheet can also be designated as the target to be reprinted.

As illustrated in FIG. 3, furthermore, the display image 50 of this embodiment also shows an instruction button 68 and an instruction button 69. The instruction button 68 is a button designated by the user when the user makes an instruction to execute reprinting. The instruction button 69 is a button designated by the user when the user makes an instruction to terminate the display of the display image 50.

Figure 7:
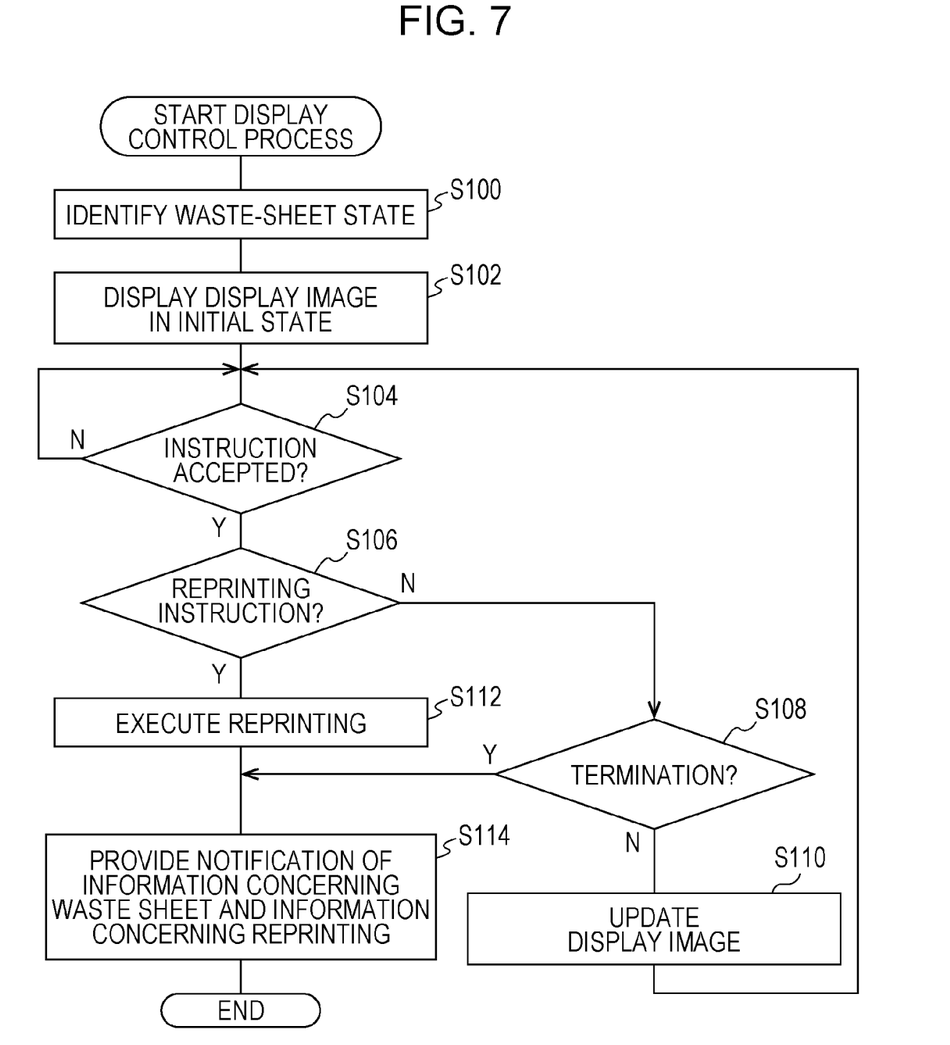
FIG. 7 is a flowchart depicting an example of the flow of a display control process executed by a control unit of the image forming apparatus of the embodiment.

FIG. 7 is a flowchart depicting an example of the flow of a display control process executed by the control unit 20 of this embodiment. In the image forming apparatus 10 of this embodiment, when images are successively formed on a plurality of recording media by the image forming unit 22 and the in-line sensor 24 reads the images formed on the recording media to generate image data, the control unit 20 executes a display control program stored in the ROM 20B, thereby executing the display control process illustrated in FIG. 7.

In step S100 of FIG. 7, the control unit 20 identifies the state of a waste sheet on the basis of the image data generated by the in-line sensor 24. Specifically, the control unit 20 identifies whether each of the plurality of recording media on which the images are formed is a waste sheet. In the case of a waste sheet, the control unit 20 identifies a cause of the waste sheet. The method for identifying whether a waste sheet is generated and the method for identifying a cause of waste sheets, which are performed by the control unit 20, are not particularly limited. For example, the control unit 20 may identify whether a waste sheet is generated on the basis of a result of comparison between an image corresponding to image data generated by the in-line sensor 24 and an image corresponding to the original image data (image data used to form an image).

Then, in step S102, the control unit 20 displays, for the display image 50 indicating the state of a waste sheet, the display image 50 in the initial state on the touch panel display 35 on the basis of the waste-sheet state identified in step S100.

Then, in step S104, the control unit 20 determines whether an operation for making an instruction (designation) by the user has been accepted. In step S104, the determination remains negative until the control unit 20 detects, with the operation input detection unit 32, an operation performed by the user through the touch panel display 35. On the other hand, when the control unit 20 detects, with the operation input detection unit 32, an operation performed by the user, the determination becomes positive. Then, the process proceeds to step S106.

In step S106, the control unit 20 determines whether the accepted instruction is a reprinting instruction. If the user has designated a button other than the instruction button 68, the determination of step S106 becomes negative, and then the process proceeds to step S108. In step S108, the control unit 20 determines whether the accepted instruction is a termination instruction. If the user has designated a button other than the instruction button 69, the determination of step S108 becomes negative, and then the process proceeds to step S110.

In step S110, as described above, the control unit 20 updates the display image 50 so as to present an image in accordance with the content of the accepted instruction, and then the process returns to step S104.

On the other hand, if the accepted instruction is a termination instruction, a positive determination is obtained in step S108, and then the process proceeds to step S114.

If the accepted instruction is a reprinting instruction, a positive determination is obtained in step S106, and then the process proceeds to step S112. In step S112, the control unit 20 causes the image forming unit 22 to execute reprinting in accordance with the content of the accepted instruction.

In step S114, the control unit 20 notifies a predetermined external device of predetermined information concerning a waste sheet and predetermined information concerning reprinting via the I/F unit 36, and then the display control process ends. Examples of the predetermined information concerning a waste sheet include information concerning the number of waste sheets and the position of a waste sheet (which sheet is a waste sheet). Examples of the predetermined information concerning reprinting include information concerning the number of recording media to be reprinted and the position of a recording medium to be reprinted (which sheet is to be reprinted). Examples of the predetermined external device include a device related to a step preceding image formation performed by the image forming apparatus 10 and a device related to a step subsequent to image formation performed by the image forming apparatus 10. When the process preceding or subsequent to image formation is performed manually, a terminal device that a person who is in charge of such a step has is the external device. Examples of the step preceding image formation include a step of cutting a recording medium to a desired size to prepare the recording medium. Examples of the step subsequent to image formation include a step of replacing a waste sheet with a reprinted recording medium.

As described above, in the image forming apparatus 10 of this embodiment, when images are successively formed on a plurality of recording media by the image forming unit 22, the control unit 20 obtains waste-sheet information indicating whether each of the plurality of recording media is a waste sheet and, for a waste sheet, indicating a cause of the waste sheet; identifies whether each of the recording media is a waste sheet in accordance with the obtained waste-sheet information; and, in a case of a waste sheet, performs control to display a waste-sheet state display image 54 that makes a cause of the waste sheet distinguishable in chronological order of formation of the images in the first display region 52 of the display image 50 on the touch panel display 35.

The waste-sheet state display image 54 includes a sheet number 54A indicating which of the recording media on which the images are successively formed the recording medium is, an image 54B indicating whether the front side of the recording medium is a waste sheet, and an image 54C indicating whether the rear side of the recording medium is a waste sheet. When the recording medium is a waste sheet, furthermore, colors of the image 54B and the image 54C differ depending on the cause of the waste sheet.

In the image forming apparatus 10 of this embodiment, accordingly, the display image 50 displayed on the touch panel display 35 includes the waste-sheet state display images 54. The display image 50 allows the user to recognize a position where a waste sheet is generated (which sheet is a waste sheet), a side where a waste sheet is generated (either the front side, the rear side, or both sides), and a cause of the waste sheet easily, for example, at a glance. As a result of checking the condition of a waste sheet, the user can thus easily specify a reprinting target through the touch panel display 35.

Accordingly, an image forming apparatus of this embodiment enables a user to easily perform reprinting when a waste sheet is generated.

In the image forming apparatus 10 of this embodiment, furthermore, a recording medium that is not a waste sheet can also be set as a reprinting target. Thus, for example, even if a recording medium that is not a waste sheet is present between waste sheets, the image forming apparatus 10 of this embodiment can collectively set, as reprinting targets, the waste sheets and the recording medium that is present between the waste sheets and that is not a waste sheet. This can simplify the labor of replacing waste sheets with reprinted recording media.

Figure 8:
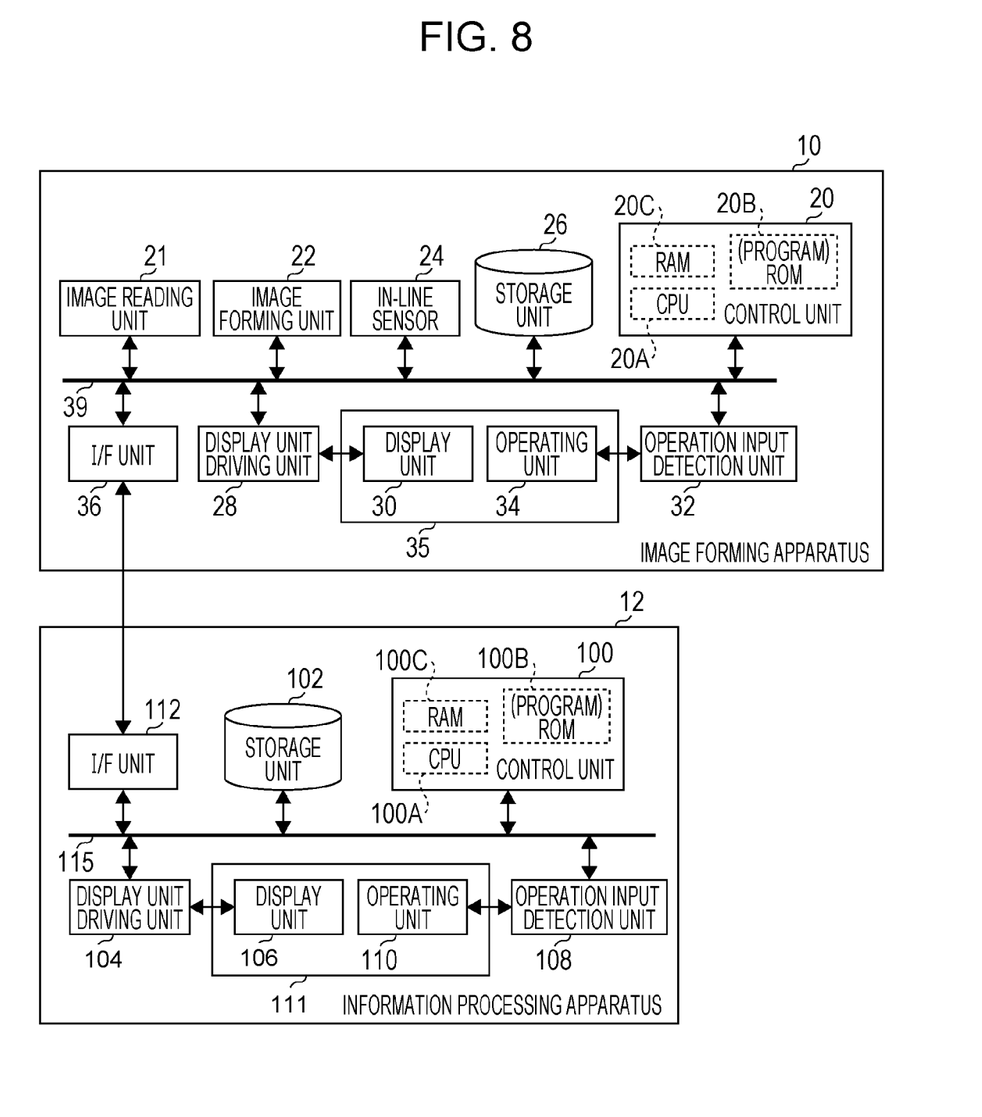
FIG. 8 is a block diagram illustrating an example configuration of the image forming apparatus and an information processing apparatus of the embodiment.

It goes without saying that the configuration, operation, and so on of the image forming apparatus 10 described in this embodiment are examples and can be modified according to the situation without departing from the gist of the present invention. For example, in this embodiment, an embodiment has been described in which the image forming apparatus 10 has a function of an information processing apparatus according to an example of the present disclosure and in which the display image 50 is displayed on the touch panel display 35. However, an embodiment may be implemented in which the display image 50 may be displayed on a display unit of any other device. For example, the display image 50 may be displayed on an information processing apparatus 12 carried by the user of the image forming apparatus 10, such as an information processing apparatus 12 illustrated in FIG. 8. As illustrated in FIG. 8, the information processing apparatus 12 includes a control unit 100, a storage unit 102, a display unit driving unit 104, a display unit 106, an operation input detection unit 108, an operating unit 110, and an I/F unit 112.

The control unit 100, the storage unit 102, the display unit driving unit 104, the operation input detection unit 108, and the I/F unit 112 are connected via a bus 115, such as a system bus or a control bus, so as to be capable of sending and receiving various information to and from each other.

The control unit 100 controls the overall operation of the information processing apparatus 12. The control unit 100 includes a CPU 100A, a ROM 100B, and a RAM 100C. The ROM 100B stores in advance various programs that are executed by the CPU 100A, and so on. The RAM 100C temporarily stores various data. The storage unit 102 stores various information and the like that are accepted from the image forming apparatus 10 via the I/F unit 36. Specific examples of the storage unit 102 include an HDD and an SSD. In the case illustrated in FIG. 8, the control unit 100 of the information processing apparatus 12 corresponds to an example of an obtaining unit, a control unit, a first acceptance unit, a second acceptance unit, an output unit, and a notification unit of the present disclosure.

The display unit 106 displays the display image 50 described above and so on. The display unit driving unit 104 controls display of the display image 50 and the like on the display unit 106 in accordance with the control of the control unit 100. The operating unit 110 is used by a user to input an instruction related to image formation or the like including an instruction related to reprinting. The operating unit 110 is not particularly limited, examples of which include a touch panel, a touch pen, a keyboard, and a mouse. As in the image forming apparatus 10, the operating unit 110 and the display unit 106 are integrated into a single unit called a touch panel display 111. The operation input detection unit 108 detects an operating state of the operating unit 110. The IN unit 112 performs communication of various information with an external device via wireless communication or wired communication.

Figure 9:
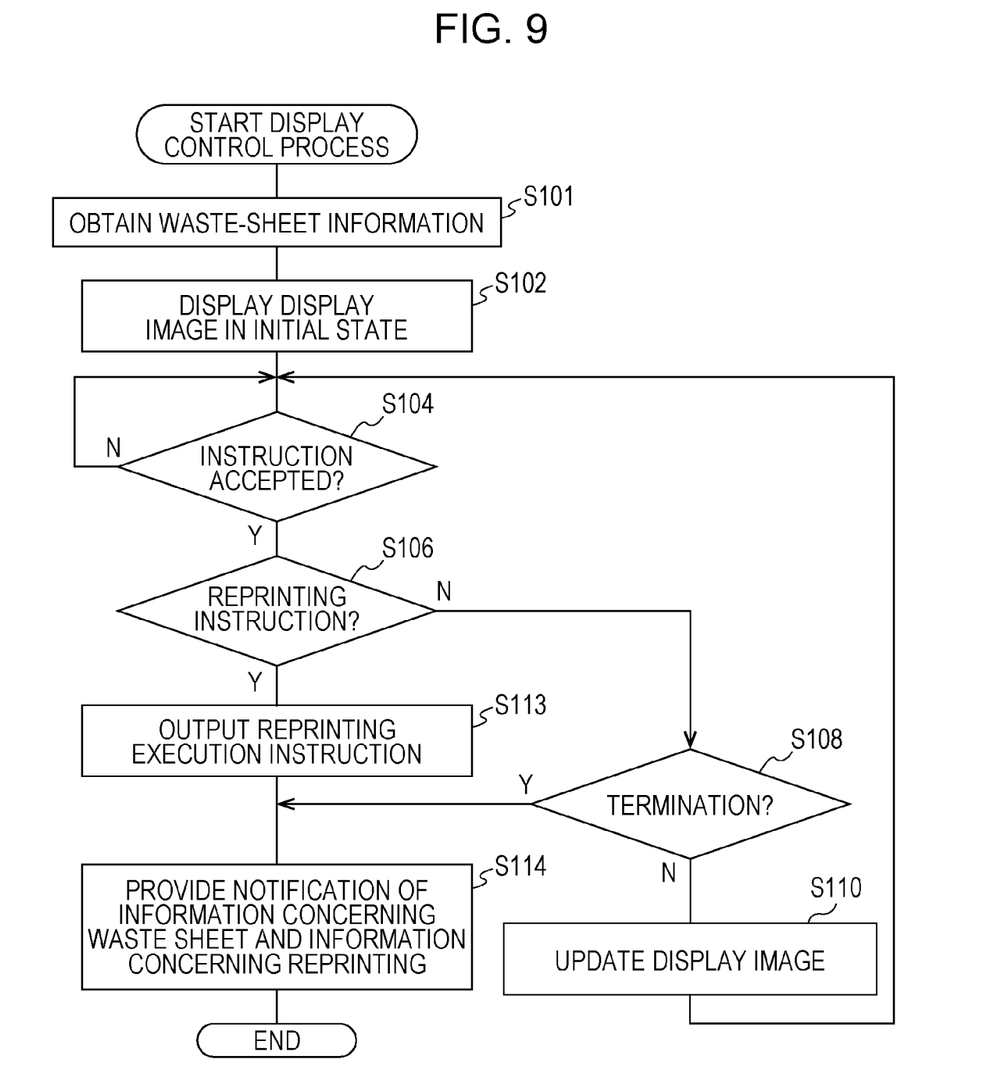
FIG. 9 is a flowchart depicting an example of the flow of a display control process executed by a control unit of the information processing apparatus of the embodiment.

For example, in this case, upon receipt of an instruction to check the condition of a waste sheet in recording media on which images are successively formed by the image forming apparatus 10 from the user who has operated the touch panel display 111, the control unit 100 of the information processing apparatus 12 executes a display control process illustrated in FIG. 9 to perform control to display the display image 50 on the touch panel display 111. FIG. 9 illustrates a flowchart depicting an example of the flow of a display control process executed by the control unit 100 of the information processing apparatus 12. The control unit 100 executes a display control program stored in the ROM 100B, thereby executing the display control process illustrated in FIG. 9.

The display control process illustrated in FIG. 9 is different from the display control process (see FIG. 7) executed by the control unit 20 of the image forming apparatus 10 in that the processing of step S101 is executed instead of step S100 and the processing of step S113 is executed instead of step S112.

In step S101 illustrated in FIG. 9, the control unit 100 obtains, from the image forming apparatus 10, waste-sheet information identified by the control unit 20 of the image forming apparatus 10 via the I/F unit 112. Instead of the control unit 20 of the image forming apparatus 10 identifying waste-sheet information and the control unit 100 obtaining the waste-sheet information from the image forming apparatus 10, the control unit 100 of the information processing apparatus 12 may obtain image data generated by the in-line sensor 24 of the image forming apparatus 10 and identify waste-sheet information on the basis of the obtained image data.

In step S113 illustrated in FIG. 9, the control unit 100 outputs a reprinting execution instruction to the image forming apparatus 10 via the I/F unit 112 to execute reprinting in accordance with the content of the accepted instruction. The control unit 20 of the image forming apparatus 10, to which the reprinting execution instruction has been input, causes the image forming unit 22 to execute reprinting in accordance with the input reprinting execution instruction.

Figure 10:
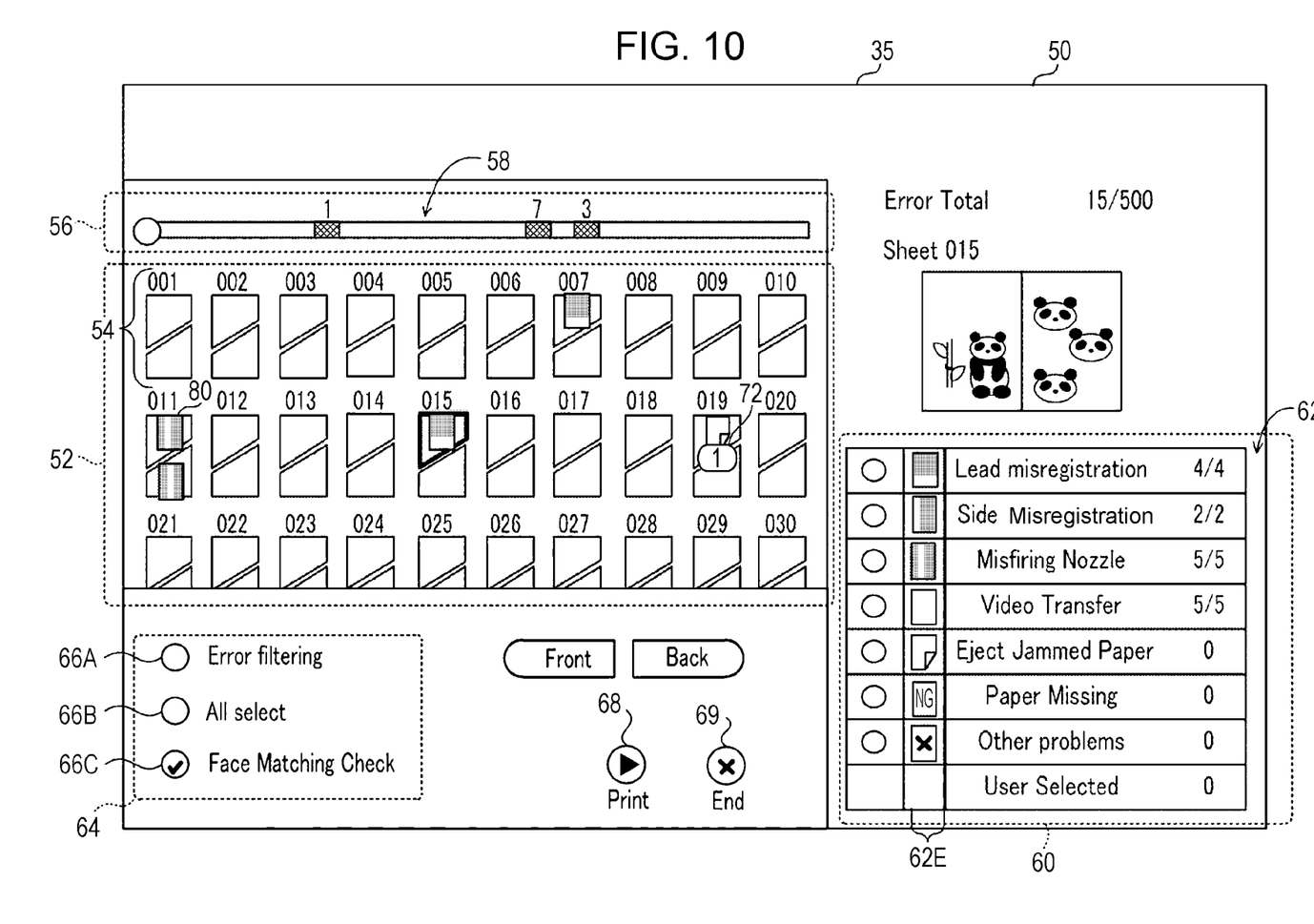
FIG. 10 is a diagram illustrating another example of a display image displayed on the touch panel display of the image forming apparatus of the embodiment.

In this embodiment, an embodiment has described in which the colors of the image 54B and the image 54C in each of the waste-sheet state display images 54 differ depending on the cause of waste sheets. However, the display of information for distinguishing a cause of waste sheets is not limited to changing of colors. In an embodiment, for example, as illustrated in FIG. 10, a mark 80, such as a sign or an icon, for distinguishing a cause of waste sheets may be superimposed and displayed on a waste-sheet state display image 54. Alternatively, in an embodiment, text for distinguishing a cause of waste sheets, including the cause of waste sheets itself, may be superimposed and displayed on a waste-sheet state display image 54. In the display image 50 illustrated in FIG. 10, instead of the color images 62B of the correspondence relationship image 62 in the third display region 60 of the display image 50 illustrated in FIG. 3 and FIG. 6, a mark image 62E indicating marks corresponding to causes of waste sheets is presented.

The display control process, which is executed by having a CPU execute software (program) in the embodiment described above, may be executed by various processors other than the CPU. Examples of the processors in this case include a PLD (Programmable Logic Device) whose circuit configuration can be changed after production, such as an FPGA (field-programmable gate array), and a dedicated electric circuit that is a processor having a circuit configuration designed for a dedicated purpose of executing a specific process, such as an ASIC (Application Specific Integrated Circuit). The display control process may be executed by one of such various processors or a combination of two or more processors of the same type or different types (such as a plurality of FPGAs or a combination of a CPU and an FPGA). The hardware structure of such various processors is more specifically an electric circuit that is formed of a combination of circuit elements such as semiconductor elements.

In the embodiment described above, furthermore, an embodiment has been described in which a display control process program is stored (installed) in advance in the ROM 20B of the image forming apparatus 10 or the ROM 100B of the information processing apparatus 12. However, this is not meant to be limiting. The display control process program may be provided in a manner of being recorded on a recording medium such as a CD-ROM (Compact Disk Read Only Memory), a DVD-ROM (Digital Versatile Disk Read Only Memory), and a USB (Universal Serial Bus) memory. Alternatively, in an embodiment, the display control process program may be downloaded from an external device via a network.

REFERENCE SIGNS LIST 10 image forming apparatus
12 information processing apparatus
20, 100 control unit, 20A, 100A CPU, 20B, 100B ROM, 20C, 100C RAM
21 image reading unit
22 image forming unit
24 in-line sensor
26, 102 storage unit
28, 104 display unit driving unit
30, 106 display unit
32, 108 operation input detection unit
34, 110 operating unit
35, 111 touch panel display
36, 112 I/F unit
39, 115 bus
50 display image
52 first display region
54 waste-sheet state display image, 54A sheet number, 54B image, 54C image
56 second display region
58 waste-sheet position image, 58A bar image, 58B slider image, 58C number
60 third display region
62 correspondence relationship image, 62A selection button, 62B color image, 62C text, 62D number, 62E mark image
64 fourth display region,
66A, 66B, 66C selection button
68, 69 instruction button
72 number of copies to be reprinted
80 mark

What is claimed is:

1. An information processing apparatus comprising:
   an obtaining unit that, when images are successively formed on a plurality of recording media by an image forming unit, obtains waste-sheet information indicating whether each of the plurality of recording media is a waste sheet and, for a waste sheet, indicating a cause of the waste sheet; and
   a control unit that identifies whether each of the recording media is a waste sheet in accordance with the waste-sheet information obtained by the obtaining unit, and, in a case of a waste sheet, performs control to arrange and display, on a display unit, a waste-sheet state display image that makes a cause of the waste sheet distinguishable in chronological order of formation of the images.

2. The information processing apparatus according to claim 1, wherein
   the control unit performs control to change a color of the waste-sheet state display image in accordance with the cause of the waste sheet, thereby making the cause of the waste sheet distinguishable.

3. The information processing apparatus according to claim 2, wherein
   the control unit performs control to further display, on the display unit, a correspondence relationship image indicating a correspondence relationship between the color and the cause of the waste sheet.

4. The information processing apparatus according to claim 3, wherein
   a priority is determined in advance for each of causes of waste sheets, and
   the correspondence relationship image is an image indicating correspondence relationships between a plurality of the colors and the causes of waste sheets in order in which the correspondence relationships are arranged according to the priorities.

5. The information processing apparatus according to claim 1, wherein
   the control unit causes a mark corresponding to the cause of the waste sheet to be superimposed and displayed on the waste-sheet state display image, thereby making the cause of the waste sheet distinguishable.

6. The information processing apparatus according to claim 1, wherein
   a priority is determined in advance for each of causes of waste sheets, and
   when one waste sheet has a plurality of causes, the waste-sheet state display image is an image that makes a highest-priority cause among the causes distinguishable.

7. The information processing apparatus according to claim 1, wherein
   the control unit performs control to further display, on the display unit, a waste-sheet position image indicating a position of the waste sheet in chronological order of formation of the images on the plurality of recording media.

8. The information processing apparatus according to claim 1, wherein
   the control unit causes the waste-sheet state display images for a predetermined number of recording media to be arranged and displayed in chronological order, starting from a recording medium designated by a user.

9. The information processing apparatus according to claim 1, further comprising:
   a first acceptance unit that accepts designation of a waste sheet to be reprinted;
   a second acceptance unit that accepts an instruction to execute reprinting; and
   an output unit that outputs, when the second acceptance unit accepts an instruction to execute reprinting, a reprinting instruction to the image forming unit to reprint an image corresponding to the waste sheet for which designation has been accepted by the first acceptance unit.

10. The information processing apparatus according to claim 9, further comprising
    a notification unit that notifies a predetermined device of at least one of information concerning the waste sheet or information concerning the reprinting.

11. The information processing apparatus according to claim 1, wherein
    the image forming unit is configured to successively form images on both sides of the plurality of recording media, and
    the waste-sheet state display image is an image that identifies whether each of a front side and a rear side of one of the recording media is a waste sheet and that, in a case of a waste sheet, makes a cause of the waste sheet distinguishable.

12. The information processing apparatus according to claim 1, wherein the image forming unit is configured to successively form images on the plurality of recording media by using variable printing.

13. An image forming apparatus comprising:

an image forming unit that successively form images on a plurality of recording media;

an obtaining unit that, when the images are successively formed on the plurality of recording media by the image forming unit, obtains waste-sheet information indicating whether each of the plurality of recording media is a waste sheet and, for a waste sheet, indicating a cause of the waste sheet; and a control unit that identifies whether each of the recording media is a waste sheet in accordance with the waste-sheet information obtained by the obtaining unit, and, in a case of a waste sheet, performs control to arrange and display, on a display unit, a waste-sheet state display image that makes a cause of the waste sheet distinguishable in chronological order of formation of the images.

14. A display control method comprising the processes of:

when images are successively formed on a plurality of recording media by an image forming unit, obtaining waste-sheet information indicating whether each of the plurality of recording media is a waste sheet and, for a waste sheet, indicating a cause of the waste sheet; and identifying whether each of the recording media is a waste sheet in accordance with the obtained waste-sheet information, and, in a case of a waste sheet, performing control to arrange and display, on a display unit, a waste-sheet state display image that makes a cause of the waste sheet distinguishable in chronological order of formation of the images.

15. A non-transitory computer readable recording medium storing a display control program comprising the processes of:

when images are successively formed on a plurality of recording media by an image forming unit, obtaining waste-sheet information indicating whether each of the plurality of recording media is a waste sheet and, for a waste sheet, indicating a cause of the waste sheet; and identifying whether each of the recording media is a waste sheet in accordance with the obtained waste-sheet information, and, in a case of a waste sheet, performing control to arrange and display, on a display unit, a waste-sheet state display image that makes a cause of the waste sheet distinguishable in chronological order of formation of the images.

* * * * *